United States Patent [19]
Holly

[11] 3,964,114
[45] June 22, 1976

[54] MOLDING APPARATUS
[75] Inventor: James A. Holly, Richton Park, Ill.
[73] Assignee: Hollymatic Corporation, Park Forest, Ill.
[22] Filed: July 5, 1973
[21] Appl. No.: 376,627

[52] U.S. Cl. .................................................. 17/32
[51] Int. Cl.² ......................................... A22C 7/00
[58] Field of Search ................ 17/32; 425/141, 202, 425/238, 242 R, 245 R

[56] References Cited
UNITED STATES PATENTS
3,416,187  12/1968  Chartier .................................. 17/32

Primary Examiner—Robert Peshock
Attorney, Agent, or Firm—Hofgren, Wegner, Allen, Stellman & McCord

[57] ABSTRACT

A high capacity molding apparatus operable without substantial pause for molding a series of articles such as food material patties having a movable mold, a continuously operable drive for moving the mold between a position in which a mold opening is in communication with a material supply means and a discharge position and return, a pressure device for forcing material from the supply at the filling position at the mold opening, a continuously movable drive operable through successive pressure cycles for operating the pressure device in which the mold moving structure is operated out of time phase with the pressure operating structure for initiating the mold movement prior to the completion of a corresponding pressure cycle. The disclosure also includes an improved removal device for removing the shaped articles from the mold openings. The disclosure also includes an improved filling arrangement for filling the mold opening from the supply of moldable material.

12 Claims, 13 Drawing Figures

MOLDING APPARATUS

BACKGROUND OF THE INVENTION

One of the features of this invention is to provide an improved high capacity molding apparatus that is operable at high speed without substantial pause of the mold in which continuously operable means are provided for moving the mold and continuously movable means are provided for operating pressure means but with the two being operated out of time phase for initiating movement of the mold away from the filling position prior to completion of a pressure cycle with the pressure means.

Another feature of the invention is to provide an improved mold filling structure in which a supply passage has an exit to a mold opening with the periphery of the exit of the supply passage being spaced inwardly of the peripheral lateral side surface of the mold cavity with the result that superior molded articles are produced.

The most pertinent prior art of which applicant is aware are U.S. Pat. Nos. 3,417,425; 3,474,491; 3,654,665 and 3,623,188.

DESCRIPTION OF THE PREFERRED EMBODIMENTS

Figure 7:
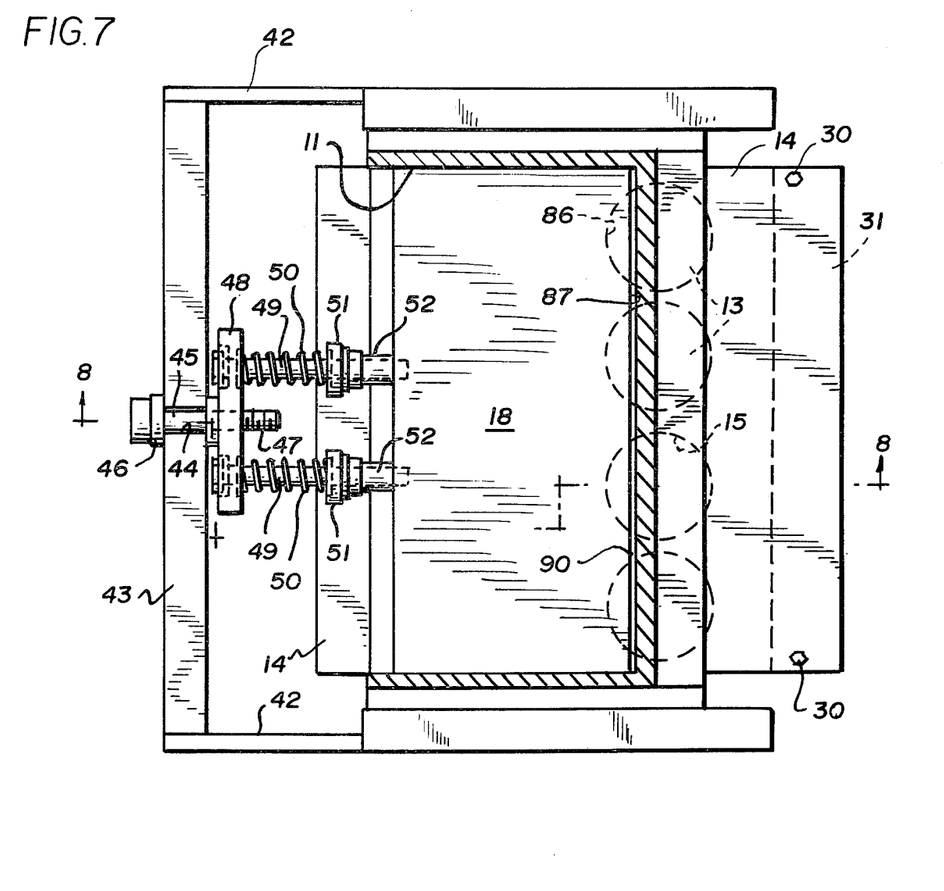
FIG. 7 is a fragmentary horizontal sectional view illustrating one embodiment of the pressure ram drive and mold plate combination.

In the embodiment of a molding apparatus 10 illustrated in the drawings there is provided a supply means 11 in the form of a large hopper for retaining a supply 12 of moldable material such as ground meat, fish or other finely subdivided food material for molding into successive shaped articles such as flat patties 13 (FIG. 7). The apparatus includes a movable mold 14 in the form of a flat plate having one or more shaping openings of any desired configuration such as the circular shape 15 of the embodiment of FIGS. 7–9, square shape 16 as in the embodiment of FIG. 10 or any other desired configuration of which a general chop shape (not shown) is a further example.

Figure 1:
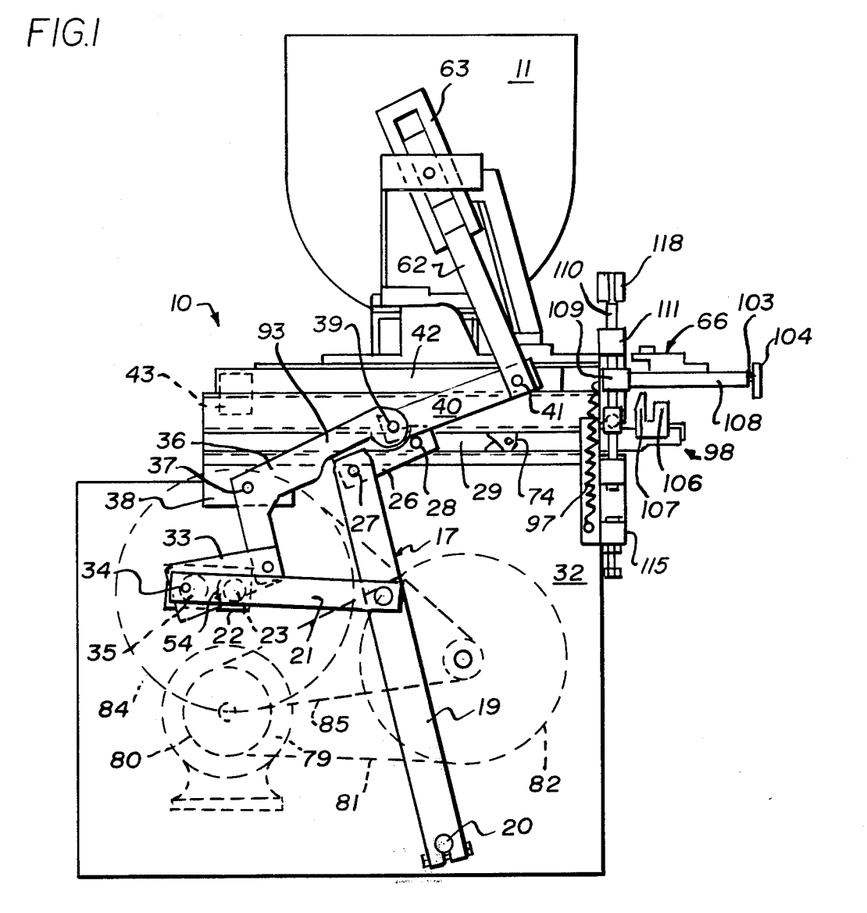
FIG. 1 is a side elevational view of a high capacity molding apparatus embodying the invention.
Figure 3:
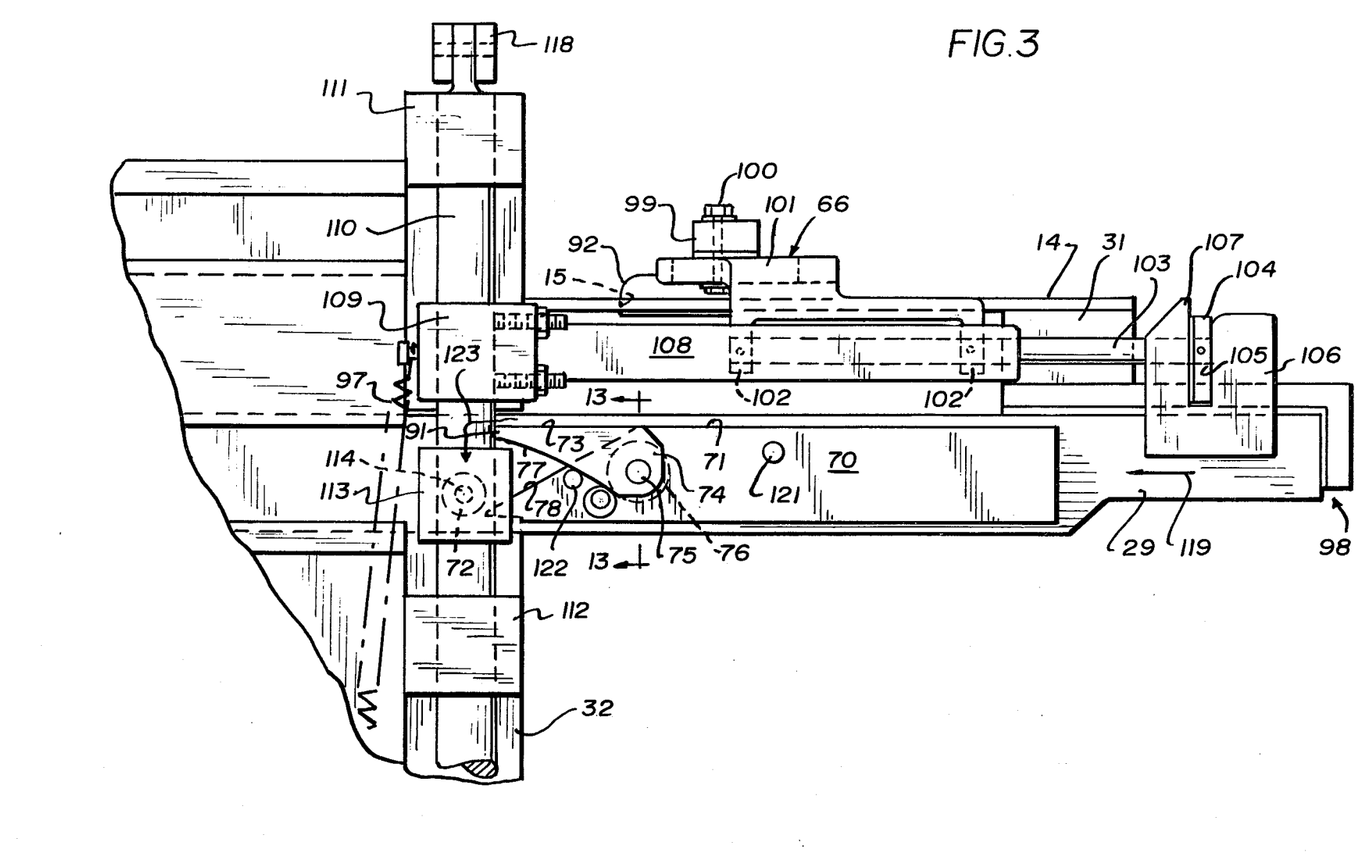
FIG. 3 is an enlarged fragmentary side elevational view of the removal portion of the apparatus.
Figure 8:
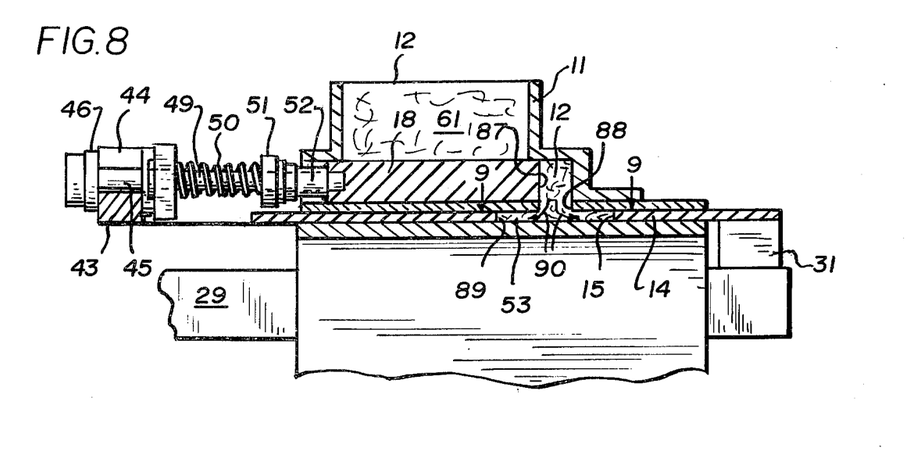
FIG. 8 is a vertical sectional view illustrating a second embodiment of an arrangement for filling a mold opening.

In order to drive the mold in a path such as the exemplary horizontal reciprocation between an opening filling position as illustrated in FIG. 1 where the mold opening is in communication with the supply means 11 and a discharge position as illustrated in FIG. 3 where the shaped article or articles is removed and return, there are provided continuously operable means 17 for moving both the mold in its path and for moving pressure means illustrated by the horizontally reciprocable ram 18 shown in two embodiments in FIGS. 7 and 8.

The continuously operable means 17 which in this embodiment drives both the mold plate and the ram comprises a first lever system including an upstanding rocker arm 19 on each side of the apparatus with each rocker arm pivoted about a pivot pin 20. In order to provide continuously operable means for moving the mold in its horizontal path each rocker arm 19 has hingedly attached to it one end of a first link 21 whose opposite end is hingedly attached to a drive link 22 that is rotated about a horizontal shaft 23 that is common to the two drive links 22 on opposite sides of the machine and which forms a first system continuously rotatable member. The drive for the links 22 is provided by the horizontal shaft 23 that extends between the opposite sides 24 and 25 of the machine.

In order to provide the drive for the mold plate 14 the end of the rocker arm 19 that is opposite the pivot pin 20 is hingedly connected to a mold plate drive link 26 on each side of the machine. This link 26 is relatively short and has one end hingedly connected at 27 to the end of the arm 19 and the other end hingedly connected at 28 to a side bar 29 on each side of the machine on which the mold plate or mold plates where more than one is used is attached as by being bolted to a transverse cross bar 31.

The rocker arms 19 on opposite sides of the frame 32 of the illustrated embodiment are also used to reciprocate the ram 18 through a second lever system forming part of a continuously movable means operable through successive pressure cycles for operating this pressure ram. In the illustrated embodiment this means comprises in addition to the rocker arms 19 a second link 33 that is also hingedly attached to the drive link 22 by means of a large pin 35 forming a second system continuously rotatable member mounted on drive link 22 and rotatably engaging the second link 33. An eccentric connection comprising a smaller eccentric pin 34 is positioned off center of the large pin 35 that is mounted on the drive link 22. The eccentric pin 34 is rotatably connected to the first link 21. With this eccentric arrangement the two rocker arms 19 are rocked through larger arcs than would be possible if the pin 34 was concentric with respect to the pin 35 rather than eccentric.

The end of the second link 33 that is opposite its pin 35 is hingedly attached to a third link 36 that is in the form of a bell crank lever that is fulcrumed at 37 to a fixed base member 38 that forms a part of the frame 32.

The end of the third link 36 that is opposite the second link 33 is hingedly connected at 39 to a fourth link 40. The end of this fourth link 40 that is opposite the connection 39 is itself hingedly connected at 41 to a side drive bar 42 for driving the ram 18.

As shown most clearly in FIGS. 7 and 8, the opposite side drive bars 42 are interconnected by a transverse bar 43. This transverse bar 43 at about its midpoint is provided with an upwardly opening groove 44. Located in this groove is a bolt 45 having a head 46 positioned against a rear surface of the transverse bar and a forwardly extended threaded end 47 that engages a transverse bar 48. This bar 48 carries a pair of forwardly extending drive bolts 49 each surrounded by a helical spring 50. The forward end of each spring 50 is retained by a cup 51 of annular shape that is attached to the rear of ram 18 by cup stems 52. The inner ends of the drive bolts 49 on compression yielding of the springs 50 are adapted to project into the interior of the cup and stem combination 51–52 so as to apply yieldable spring pressure to the ram 18 in the same manner as illustrated in prior U.S. Pat. No. 3,654,665 assigned to the same assignee as the present application.

The bell crank lever on third link 36 operation of the pressure ram in conjunction with the lever arrangement for operating the mold plate results in the ram and mold plate being reciprocated in opposite directions.

The arrangement of the linkages as illustrated results in the ram and mold plate being operated in out of phase relation with each other in that the movement of the mold plate from the filling position of FIG. 1 to the patty removal position of FIG. 3 is initiated while the ram 18 is still moving toward its extreme pressure position illustrated in FIGS. 7 and 8. This results in full molding pressure being applied to the patties 13 of the FIG. 7 embodiment and 53 of the FIG. 8 embodiment before the mold plate openings 15 have been moved out of communication with their fill openings.

Figure 2:
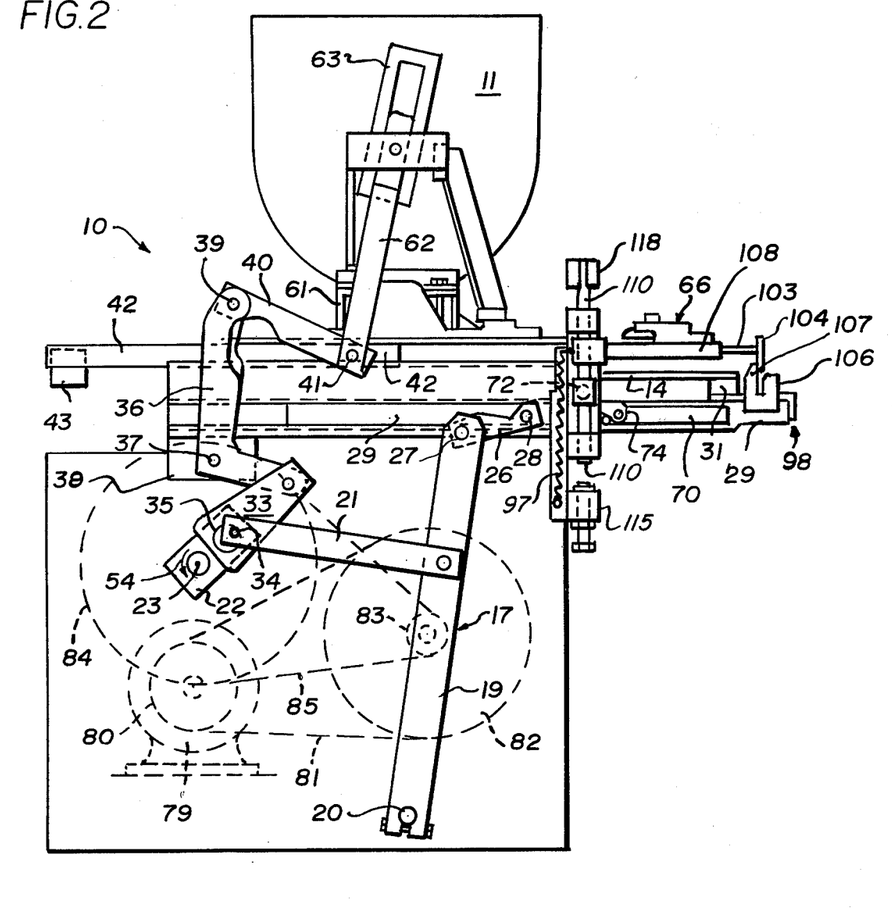
FIG. 2 is a view similar to FIG. 1 but illustrating the position of the parts just prior to the removal of the shaped articles from the mold but omitting the drive bolts 49 and associated parts for clarity of illustration.

In the illustrated embodiment this out of phase operation provided by having the drive link 22 exactly coinciding and beneath the first link 21 and with the bell crank lever on third link 36 and the fourth link 40 having not quite reached their position of linear alignment. With the drive link 22 coinciding with the first link 21 and extending in the opposite directions therefrom further rotation of the drive shaft 23 in its counterclockwise 54 rotation causes the rocker arm 19 to be rocked to the right as shown in FIG. 1 and begin the movement of the mold plate by means of the pair of drive links 26. This rotation of the drive link 22 also causes turning of the bell crank or third link 36 in a clockwise direction about its fulcrum 37 for the last 3° (in the illustrated embodiment) to where the third link 36 is exactly aligned with the fourth link 40. At this stage the drive link 22 is at a greater angle to the second link 33. Then, continued counterclockwise rotation 54 of the shaft 23 after this completion of the extent of movement of the ram 18 causes the bell crank on third link 36 to be turned in a counterclockwise direction as viewed in FIG. 1 to the position shown in FIG. 2 where the side drive bars 42 for the ram are completely retracted to the left due to the linear alignment of the drive link 22 with the second link 33. In the position of FIG. 2 the mold plate has already projected to the right and is on the way back to the fill position Thus the out of phase reciprocation of the ram and the mold plate is caused without any lost motion but merely by the angular relationship of the operating links for the mold plate and the operating links for the ram with each other.

Figure 4:
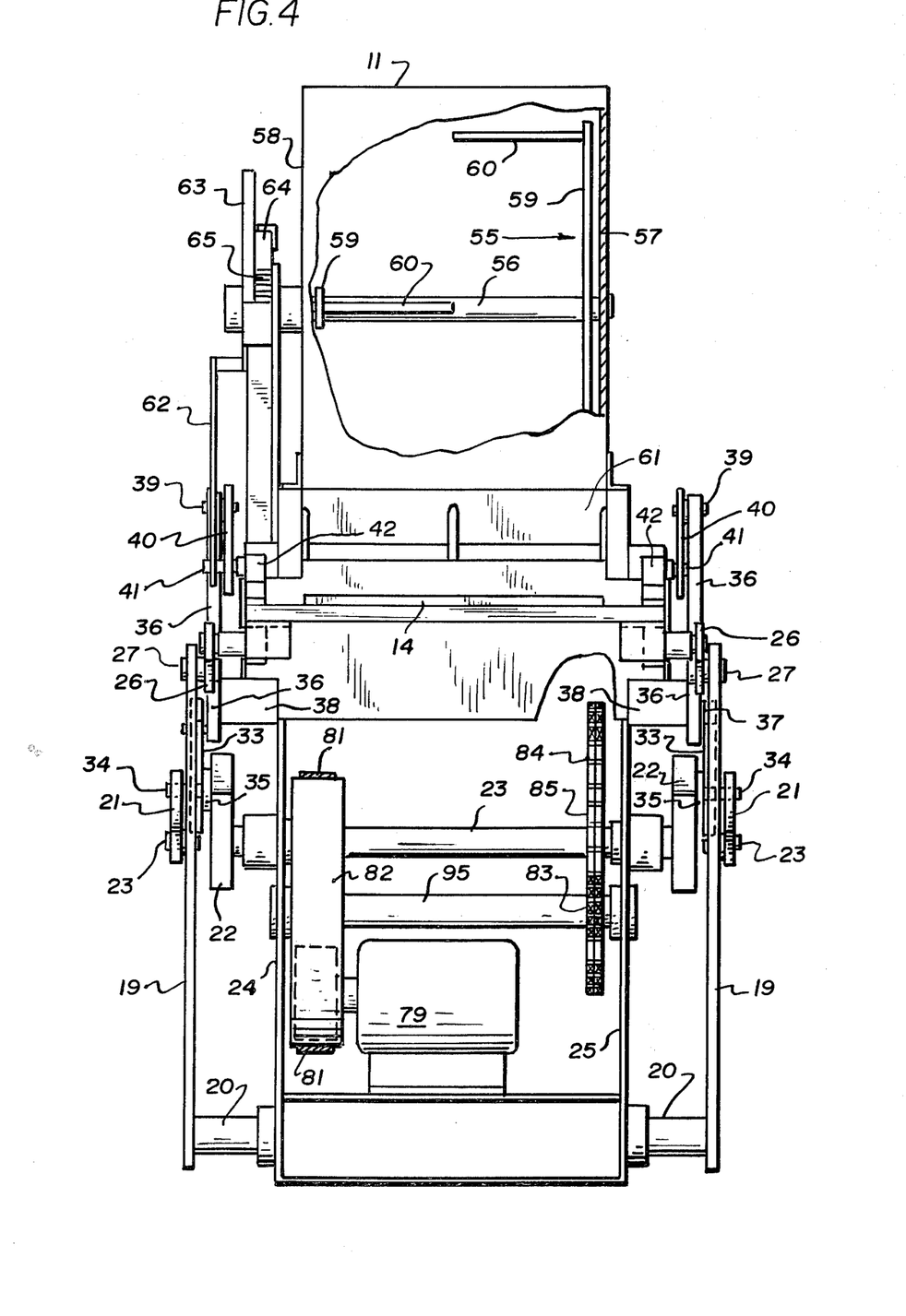
FIG. 4 is an end elevational view taken from the right-hand side of FIG. 2 with the structure for removing the article from the mold opening omitted for clarity of illustration.

In order to dislodge adherent plastic material such as ground raw meat from the inner surfaces of the supply hopper 11 there is provided a feeder 55 (see FIG. 4) that comprises a transverse shaft 56 between the sides 57 and 58 of the hopper with side bars 59 mounted thereon for rotation therewith. Each side bar 59 is located adjacent to a hopper side and is provided with inwardly projecting substantially horizontal rods 60 which on rotation of the shaft 56 will dislodge the material from the hopper side surfaces thereby aiding in feeding it to the lower area 61 of the hopper where it can be acted upon by the ram 18.

A dislodging feeder mechanism of this type is the subject of application Ser. No. 244,216, filed Apr. 14, 1972 which issued as U.S. Pat. No. 3,806,989 and is assigned to the same assignee as the present application.

The operating mechanism for the feeder 55 illustrated herein is essentially the same as that illustrated in the patent referred to immediately above. Thus there is provided a metal strap 62 that is attached to the fourth link 40 at its hinge 41 so that reciprocation of the fourth link 40 also reciprocates the strap 62 between the positions shown in FIGS. 1 and 2. This movement of the strap 62 also reciprocates a cross head 63 and with it a pawl 64 which indexes a ratchet 65 that is attached to the shaft 56 for rotation therewith. This construction which is the same as that described and claimed in the patent referred to immediately above causes indexing of the feeder 55 in successive arcuate movements upon each return movement or powerless stroke portion of the ram 18. Thus when the ram 18 is withdrawn from its forwardmost position of FIG. 7 which is in preparation for a subsequent power stroke the feeder 55 is indexed by reason of the ratchet and pawl but when the movement of the ram is toward the position shown in FIG. 7 or through a power stroke there is no corresponding movement of the feeder 55.

In order to provide for removal of the patties from the mold openings there is provided a knockout mechanism 66 that is vertically movable by being mounted at opposite ends on vertical shafts 110 with the bottom end of each 110 shaft engaging a stop 115 at the bottom of its movement. The knockout 66 is constantly urged downwardly by end tension springs 97.

The side bars 29 on opposite sides of the machine that drive the mold plate are provided with side extensions 70 on opposite sides of the machine with each having a horizontal upper surface 71 on which rides a roller 72 on each side of the knockout 66.

Figure 12:
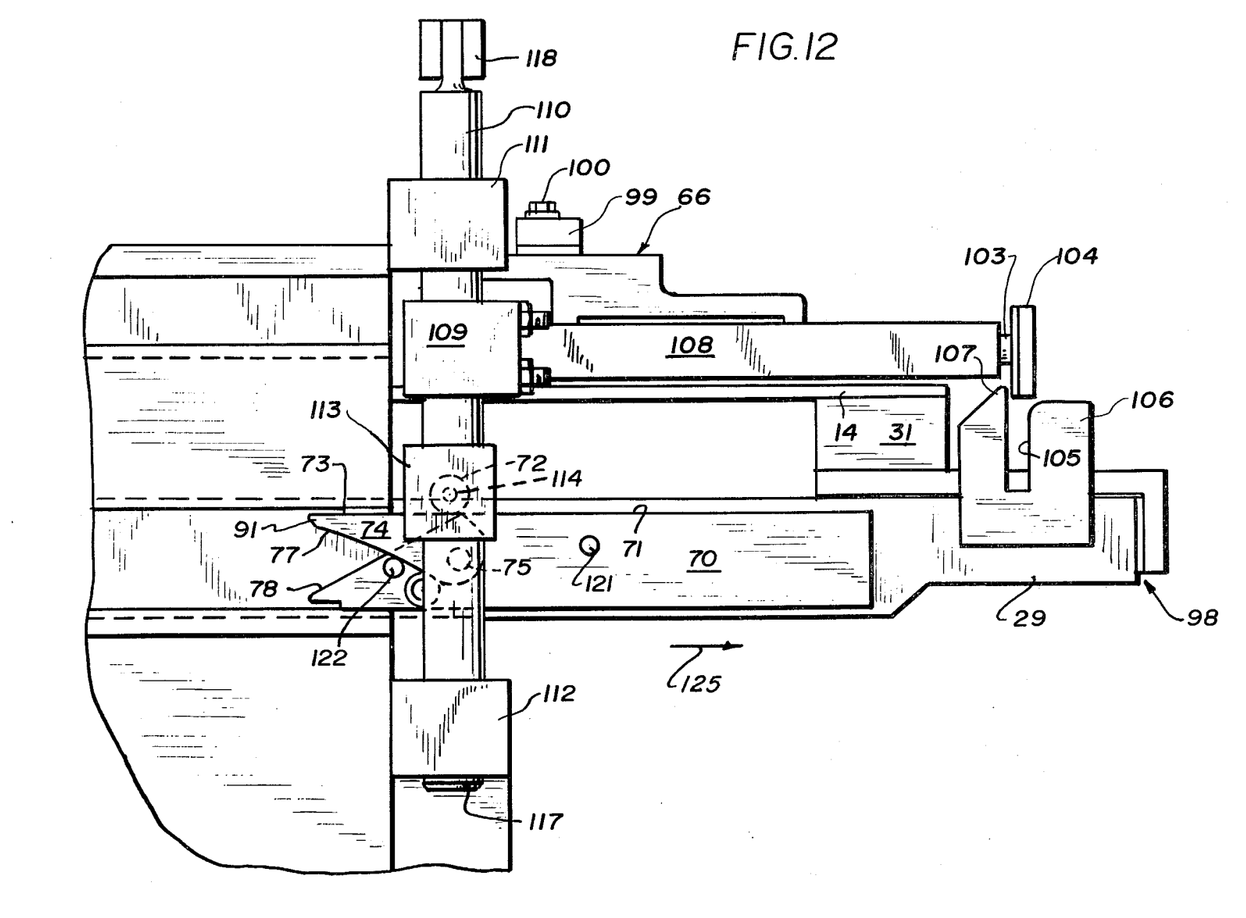
FIG. 12 is a view similar to FIG. 11 but illustrating the position of the parts during the travel of the mold plate toward extended patty removal position.
Figure 13:
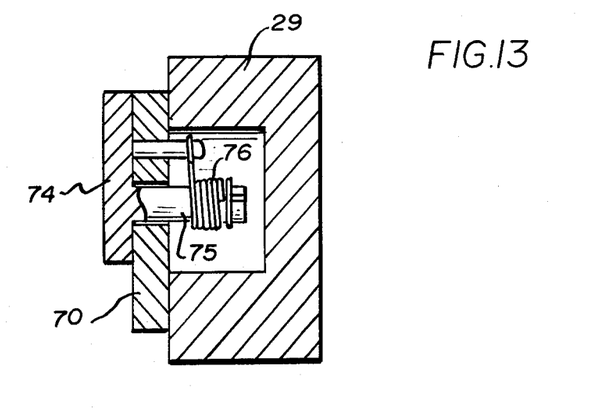
FIG. 13 is an enlarged fragmentary detail sectional view taken substantially along line 13—13 of FIG. 3.

Serving as an extension of this upper surface 71 is an aligned surface 73 of a rotatable cantilever 74 on each side extension 70. Each cantilever 74 when in operative position is rotatable about a pin 75 and is urged in the illustrated embodiment toward the position shown in FIG. 3 where the surfaces 71 and 73 are in horizontal linear alignment by means of an internal spring 76 having one end attached to an anchor. The bottom edge 77 of each cantilever 74 is angled upwardly and to the rear when in operative position as shown in FIGS. 3 and 12 to form a V with the facing cam edge 78 of the rear end of each side extension 70.

In order for the drive to be positive and without slippage so as to maintain the time relationship of the operating parts single electric motor 79 is used which drives a pulley 80 which through a belt 81 drives a larger pulley 82. This larger pulley is coaxial with a sprocket 83 so that 82 and 83 rotate in unison with connecting shaft 95. This small sprocket 83 drives an even larger sprocket 84 by means of a chain 85. This larger sprocket 84 is coaxial with and attached to the shaft 23 for rotation thereof.

In FIG. 7 there is illustrated the embodiment in which the mold shaping openings 15 are filled adjacent the inner edges 86 of the mold openings by the forward face 87 of the ram compressing the meat 12 ahead of it. As is illustrated in U.S. Pat. No. 3,486,186 assigned to the same assignee as the present application this causes the meat to fan out to fill the mold opening in each instance.

Figure 9:
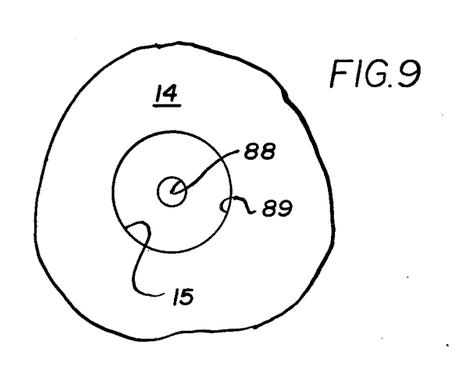
FIG. 9 is a sectional view taken substantially along line 9—9 of FIG. 8 and illustrating the production of a round patty.
Figure 10:
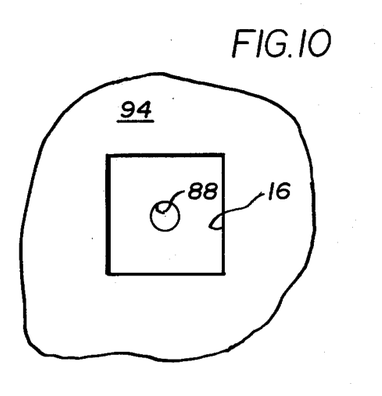
FIG. 10 is a sectional view similar to FIG. 9 but illustrating a square patty embodiment of the invention.

FIGS. 8 and 9 illustrate a second embodiment of a manner of filling the mold openings and here at the time of complete filling each opening 15 is centered beneath a cylindrical fill passage 88. As illustrated in these Figures the diameter of the fill passage 88 is considerably smaller than the diameter of the mold opening 15 so that as the face 87 of the ram 18 compresses the meat to cause it to fill each mold opening 15 the meat flows downwardly and then radiates outwardly to the circular edge surface 89 of the mold opening as illustrated in FIG. 8 by the arrows 90. This arrangement appears to provide a superior patty where the material is ground raw beef in that the patty maintains its roundness during cooking or other processing and the resulting patty appears to be more tender. The exact reason for this is not understood but it is believed necessary that the horizontal diameter of the fill passage 88 be considerably less than the diameter of the corresponding mold opening 15 and it is further preferred that at the completion of filling the fill passage and the mold opening be essentially coaxial as illustrated in FIG. 9.

Although FIGS. 8 and 9 illustrate the preferred arrangement where the mold opening and thus the resulting patty is circular the filling arrangement where the sides of the fill passage 88 are inwardly of the sides of the mold opening is also important in forming square 16 or any other noncircular patty.

Figure 6:
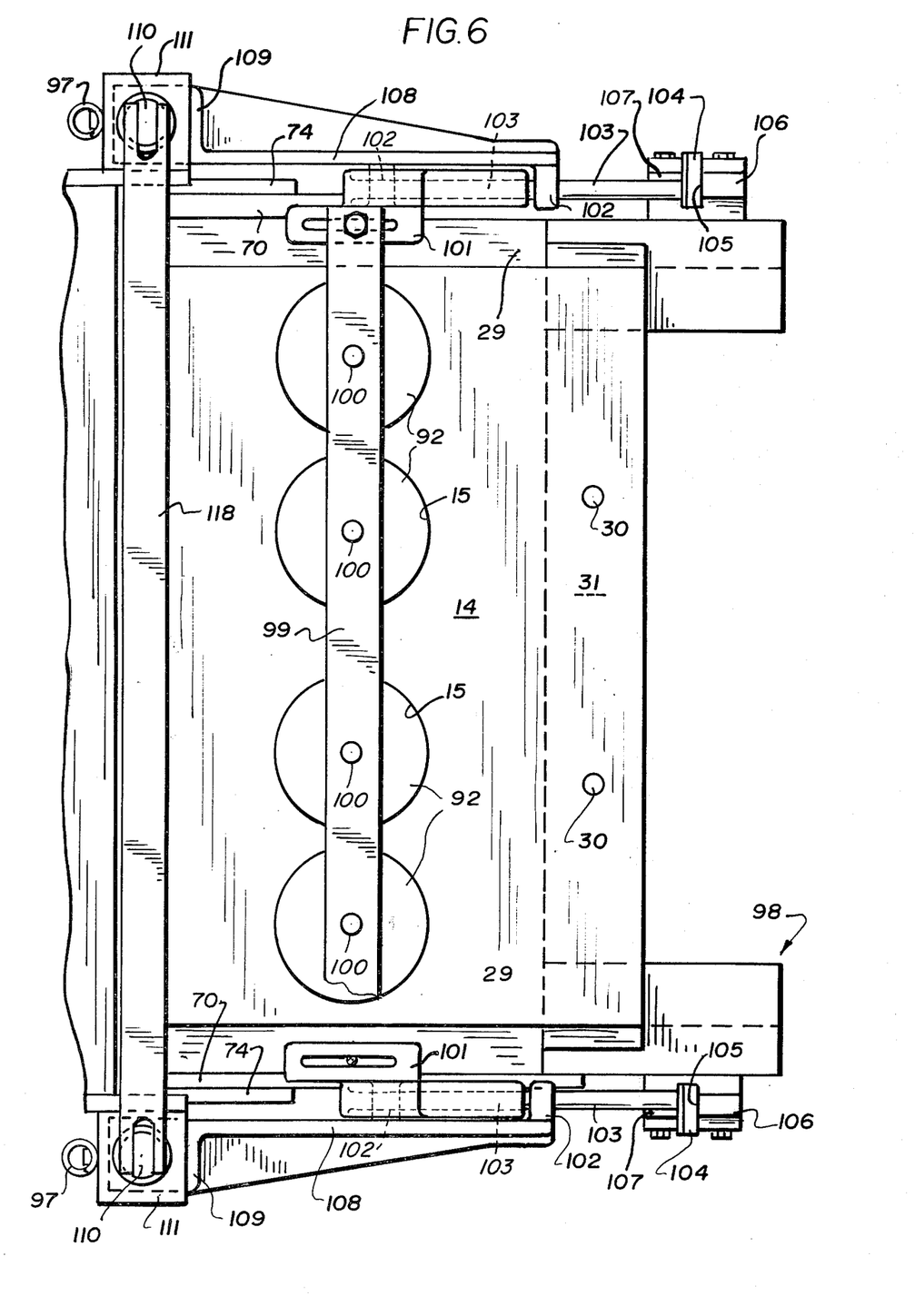
FIG. 6 is an enlarged fragmentary plan view of the structure of FIG. 3.

The patty removal or knockout device 66 has a cross bar 99 on which are mounted the knockout cups 92 with each cup being bolted to the bar 99 by a bolt 100 FIGS. 3 and 6. Each of the opposite ends of the transverse knockout bar 99 are attached to an end structure 101 each of which is attached to a horizontal shaft 103 that is slidable in spaced flanges 102 that are mounted on the side bars 108 (FIG. 6). Each shaft carries 103 at its extended end a collar 104 that is adapted to drop into a groove 105 in a vertical block 106 on each side of the machine when the knockout cups 92 are in their fully lowered position when ejecting patties from the mold openings (FIG. 3).

As can be seen in FIGS. 3 and 12 each groove 105 is vertical and opens upwardly and one side of the block 106 in which a groove is located has a tip 107 extending above the opposite side with the tip 107 being on the side of the groove nearest to the hopper 11.

Extending from the opposite sides of the machine are two horizontal parallel side bars 108 with one end of each being attached to a mounting bracket 109 which is are attached to a vertical shaft 110 (FIG. 3). Each shaft 110 is vertically slidable in a top 111 and a bottom 112 brackets both of which are rigidly attached to the frame 32 of the machine.

Figure 5:
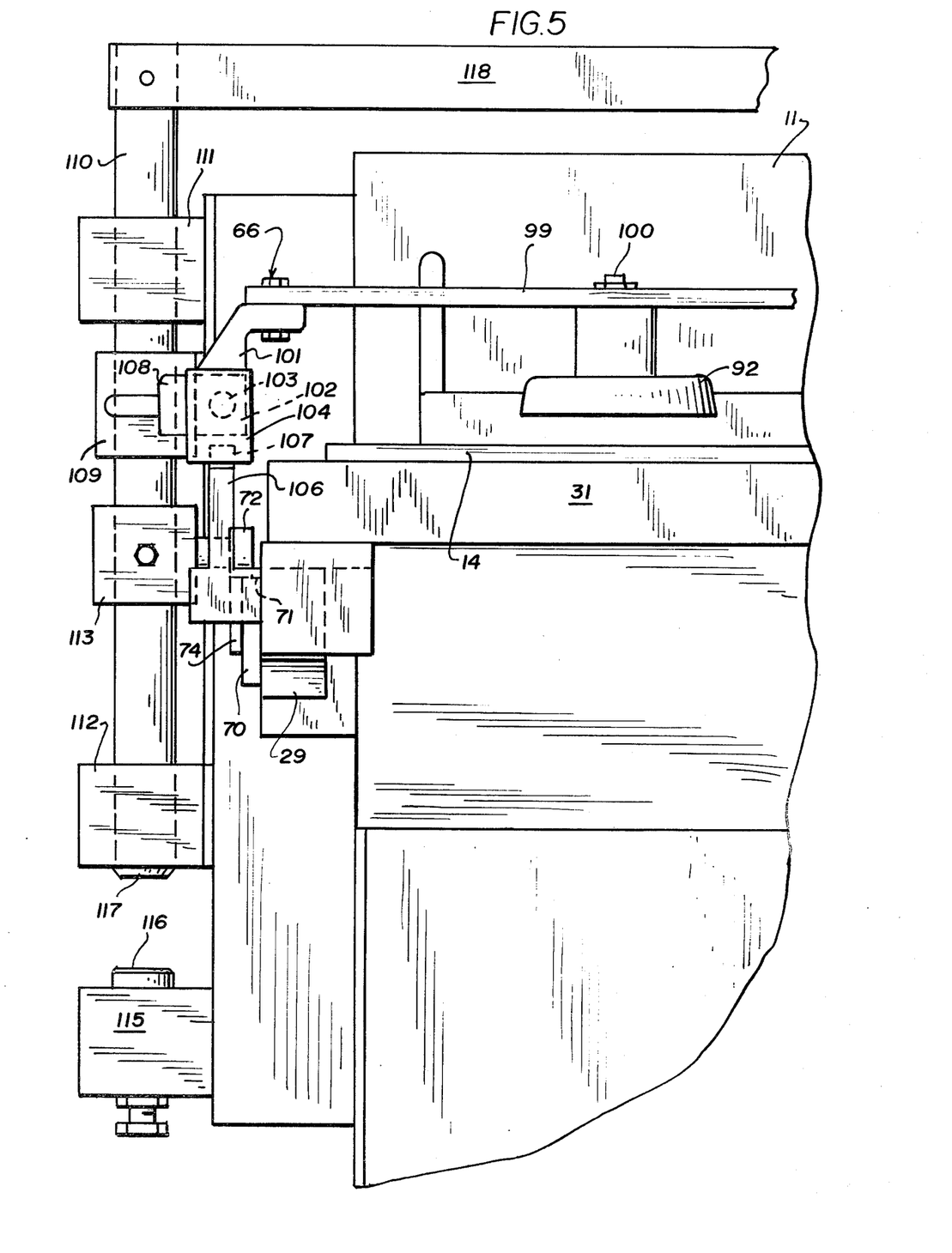
FIG. 5 is an enlarged fragmentary end elevational view taken substantially from the right-hand side of FIG. 1.

Immediately beneath each mounting block 109 and also attached to one of the shafts 110 is a block 113 carrying on its inner side a roller 72 that is mounted for rotation about an axle 114. Also mounted on the frame of the machine and beneath the shafts 110 are stop brackets 115 each having an adjustable stop 116 thereon to be engaged by the lower end 117 of the shaft 110 when the knockout device 66 is in its lowermost position (FIG. 5). The knockout device 66 is constantly urged to this lowermost position by a spring 97 on each side of the machine that is attached to the knockout by attachment to a block 109. The upper ends of the two side vertically movable shafts 110 are connected by a cross beam 118.

The operation of the illustrated embodiment of the apparatus is as follows. With the parts in the position shown in FIG. 1 and corresponding figures counterclockwise rotation 54 of the shaft 23 causes rotation of the drive link 22. This immediately starts the two rocker arms 19 on opposite sides of the machine in their arcuate movement to the right, as viewed in FIG. 1, to start immediate movement of the mold plate 14 from the filling position of FIGS. 7 or 8 to the knockout or patty removal position of FIG. 3. This initial rotation of the drive link 22 causes a corresponding rocking movement of the bell crank lever 36 so that the bell crank end 93 becomes linearly aligned on each side of the machine with the fourth link 40. This causes the final fraction of movement of the ram 18 toward the mold opening 15 with the result that solely because of this out of time phase operation of the mold plate and feeder pressure is maintained by the pressure face 87 on the material 90 in front of the ram face and extending into the mold openings 15. The resulting patties 13 are thereby maintained under full pressure until the mold plate has been moved a sufficient distance that the mold openings 15 are no longer in communication with the material at the front face 87 of the ram.

Continued rotation of the drive link 22 in the counterclockwise direction aligns the drive link with the first link 21 at which point the mold plate is in its furthest projection position ready for patty removal. Maximum movement of the mold plate is achieved by using the previously described eccentric pin 34.

The continued movement of the drive link 22 operating through the bell crank or third link 36 and fourth link 40 raises these parts to the elevated position shown in FIG. 2 to retract the ram to its full extent to the left as viewed in FIG. 7 preparatory to the next power stroke on return of the mold plate to the filling position. This powerless portion of the reciprocation of the ram also causes indexing of the feeder structure 55 as previously described to dislodge adherent material and place it in position to be acted upon by the ram 18.

When the mold plate has been projected to the knockout position of FIG. 3 the rollers 72 on each side of the knockout structure roll off the end 91 of each projecting lever 74 to snap the knockout cups 92 into the respective mold openings under the urgings of side springs 97 and dislodge the patties from the openings.

Figure 11:
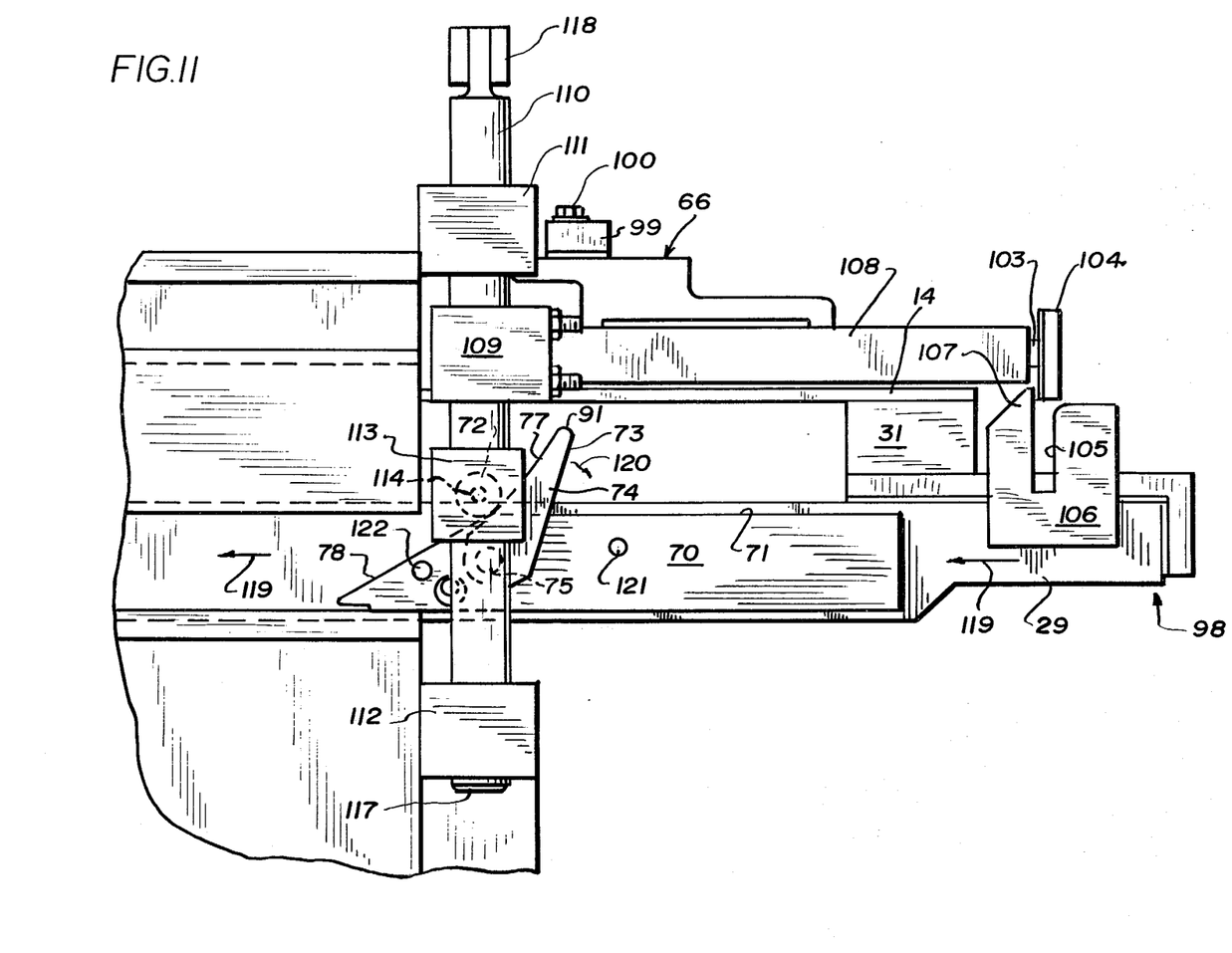
FIG. 11 is a view similar to FIG. 3 but illustrating the position of the patty removal device at an intermediate return position of the mold plate.

Reverse movement of the mold plate causes the side rollers 72 to ride up the cam edges 78 on opposite sides of the machine and engage the bottom edges 77 of the levers 74 to rotate them in a clockwise direction as viewed in FIGS. 3 and 11 to the position where each edge 77 coincides with the top edge 71 of the extensions 70. Further return movement of the knockout mechanism causes the rollers 72 to clear the edges 77 at which point the stressed springs 76 immediately reverse rotate the levers 74 to return them to their normal positions of FIG. 3 where the edge 73 of each lever 74 again coincides with the corresponding edge surface 71 on the extensions 70. This arrangement therefore provides a simple structure for operating the knockout mechanism and lifting it from the mold openings preparatory to forming and ejecting a subsequent series of patties.

The mold plate drive device 98 which includes the side bars 29 carries the side blocks 106. When the knockout device 66 is in its lowered position with the mold cups 92 within the mold openings 15 as shown in FIG. 3 the mold plate drive 98 and the mold plate 14 are in fully extended position with the side rollers 72 just having completed their vertical drop from the rearwardly projecting ends 91 of the cantilevers 74 as illustrated by the arrow 123 (FIG. 3). In this position the collars 104 which were directly above the slots or grooves 105 are now at the bottoms of their respective grooves 105 and the rollers 72 are at the lower ends of the inclined cam edges 78 of the side members 70. As can be seen from this description the knockout device 66 is in its lowermost position.

Further movement of the operating parts of the machine causes the mold plate drive device 98 to be retracted in the direction of the arrow 119 of FIG. 3. This retraction movement causes shaft 103 to slide with the knockout 66 and also causes the inclined edges 78 to engage the side rollers 72 and roll them up the incline to the position shown in FIG. 11. The combination of the sliding and rolling results in vertical lifting movement of the knockout 66. The rollers 72 engage the lower edges 77 of the cantilevers 74 and rotate them as indicated by the arrow 120 in FIG. 11. At the same time travel of the roller 72 up the inclined edges 78 lifts the knockout device 66 to remove the cups 92 from the mold openings and simultaneously remove the collars 104 from the vertical grooves 105.

Further retractive movement 119 of the mold plate drive 98 causes the side cantilevers to be rotated still further from the position in FIG. 11 each to against a first stop 121 where the edge 77 of cantilever 74 substantially coincides with the corresponding horizontal edge 71 of the side members 70. This retracting movement of the mold plate drive 98 is continued until the ends 91 of the cantilevers 74 clear the side rollers 72 at which time the springs 76 snap the cantilevers 74 around and down against the second stops 122 to the positions of FIG. 12.

Then, upon reverse or projecting movement 125 (FIG. 12) of the mold plate drive 98 and thus the mold plate 14 again toward ejecting position the edges 71 will pass under the side rollers 72. At the same time the projecting tips 107 of the blocks 106 engage the collars 104 on the shaft 103 to which the knockout device is attached to slide the knockout structure 66 in the direction 125 to a knockout position which is vertically above the position of FIG. 3 preparatory to removing a new group of patties from the mold openings 15. Thus further projecting movement 125 of the mold plate drive 98 causes the knockout device 66 to be snapped downwardly by the springs 97. In this projecting movement of the mold plate drive bars 29 the knockout device is simultaneously moved to the right as shown in FIG. 2 to proper knockout position immediately above the openings 15 at the time the side rollers 72 are ready to drop (arrow 123) to the knockout position of FIG. 3.

When the parts of the apparatus are in their positions shown in FIG. 1 the drive link 22 is aligned with the first link 21 but extends in the opposite direction from the drive link axle 23. In this position the mold plate 14 is fully retracted to the fill position for filling the mold openings 15. At the same time the bell crank end 93 and the fourth link 40 for driving the ram 18 are about 3° displaced from linear alignment but are approaching this linear alignment. This means that the ram 18 is still advancing toward the compression position or to the right in the embodiments of FIGS. 7 and 8 to complete the filling of the mold openings.

Then, on continued rotation 54 of the drive axle 23 the movement of the mold plate is reversed and begins movement toward the knockout position by the subsequent rotation of the rocker arm 19 and link 26 to the right as viewed in FIG. 1. Immediately thereafter the bell crank lever 36 begins its rotation in a counterclockwise direction as viewed in FIG. 1 to lift the two pairs of bell crank end 93 and link 40 on opposite sides of the machine to the raised position of FIG. 2 where the ram has been completely retracted. In this position of FIG. 2 the drive link 22 and second link 33 which drive the bell crank lever 36 and link 40 are linearly aligned and extending in the same direction from the drive shaft 23. Thus when the mold plate drive links 21 and 22 are aligned as in FIG. 1 but extending in opposite directions relative to the drive axle 23 the mold plate is at its greatest retraction while when links 21 and 22 are linearly aligned but extending in the same direction relative to the drive axle 23 the ram is at its point of greatest retraction. On further movement of the parts from the position shown in FIG. 2 drive link 22 becomes aligned with the first link 21 and therefore extends in the same direction relative to the drive axle 23 for maximum projection of the mold plate which is just to the right of the position shown in FIG. 2 at which maximum projection the knockout or patty removal mechanism 66 is activated as previously described to remove the patties from the mold openings 15.

One of the very great advantages of the apparatus of this invention is that only a single lever system 17 on the opposite sides of the machine is required for driving the mold plate through its path of movement from filling position to ejecting position and back again without pause except for the momentary reversal of movement in the illustrated embodiments at each end of the path of movement of the mold plate. This combined with the simple linkage system 22, 33 and 36 for reciprocating the feeder ram provides a very simple structure in which the timing of the parts can be very accurately predetermined and controlled merely by the spacing of the various axes of connection of the linkages to the drive axle 23 and to each other.

Having described my invention as related to the embodiments shown in the accompanying drawings, it is my intention that the invention be not limited by any of the details of description, unless otherwise specified, but rather be construed broadly within its spirit and scope as set out in the appended claims.

I claim:

1. High capacity molding apparatus, comprising: supply means for retaining a supply of moldable material; a rotatable drive shaft; means for rotating said shaft; a movable mold adjacent to said supply means having a shaping opening for forming shaped articles; continuously operable means comprising a first lever system including a single continuously rotatable member extending radially from said drive shaft for moving said mold in a path between an opening filling position in communication with said supply means and a discharge position for said shaped articles out of communication with said supply means, and return; pressure means for forcing material from said supply at said filling position; continuously movable means comprising a second lever system also including the same said continuously rotatable member operable through successive pressure cycles for operating said pressure means; and means including said continuously rotatable member for operating said mold moving means out of time phase with said pressure operating means for initiating said mold movement prior to the completion of a said pressure cycle.

2. The apparatus of claim 1 wherein said first lever system comprises a link hingedly connected to and substantially aligned with said continuously rotatable member just prior to said initiating.

3. The apparatus of claim 1 wherein said second lever system comprises a link hingedly attached to and out of alignment with said continuously rotatable member but movable into substantial alignment therewith at the completion of said cycle.

4. The apparatus of claim 1 wherein said mold shaping opening has a peripheral lateral side surface and said supply means includes a passage having an exit for supply of material into said mold opening, said passage having a periphery at said exit spaced inwardly of said cavity side surface during said filling whereby the material flow in filling said cavity includes flow from said passage exit laterally outwardly to fill said cavity.

5. The apparatus of claim 4 wherein said exit and said cavity are substantially coaxial during said filling.

6. The apparatus of claim 5 wherein both said exit and said peripheral side surface are essentially circular.

7. High capacity molding apparatus, comprising: supply means for retaining a supply of moldable material; a rotatable drive shaft; means for rotating said shaft; a movable mold adjacent to said supply means having a shaping opening for forming shaped articles; a rocker arm means mounted for reciprocable movement about a pivot; a first link hingedly connected to said rocker arm intermediate the ends thereof; a single drive link on said shaft rotatable about an axis and hingedly connected to said first link for reiprocating the same and thus said rocker arm; a mold drive link interconnecting said rocker arm and mold for moving the same upon said reciprocation of said rocker arm for moving said mold in a path between an opening filling position in communication with said supply means and a discharge position for said shaped articles out of communication with said supply means, and return; pressure means for forcing material from said supply at said filling position; means operable through successive pressure cycles for operating said pressure means; and means including said single drive link for operating said mold moving means out of time phase with said pressure operating means for initiating said mold movement prior to the completion of a said pressure cycle.

8. The apparatus of claim 7 wherein said continuously movable means for said pressure means comprises a second link hingedly connected to said single drive link, a third link hingedly connected to said second link and a fourth link hingedly connected to said third link and said pressure means.

9. The apparatus of claim 8 wherein said third link is fulcrumed intermediate said second and fourth links thereby providing movement of said mold and said pressure means in opposite directions on movement of said rocker arm.

10. The apparatus of claim 8 wherein said single drive link and said first link are substantially aligned at said initiating of the mold movement and said single drive link and second link are out of alignment on the approach to completion of said pressure cycle.

11. High capacity molding apparatus, comprising: supply means for retaining a supply of moldable material; a movable mold adjacent to said supply means having a shaping opening for forming shaped articles; means for moving said mold in a path between an opening filling position at said supply means and a discharge position for said shaped articles; pressure means for forcing material from said supply means at said filling position into said opening; article removing means for entering said opening at said discharge position and removing said shaped article therefrom; means operated by said moving means including a drop off over which said removing means falls at said discharge position for said entering of said opening to remove the formed article therefrom; cam means engaging said article removing means for lifting said removing means from the opening on return movement of the mold moving means; and means for moving said drop off means to an inoperable position prior to said return movement.

12. The apparatus of claim 11 wherein said drop off means comprises a hinged cantilever member extending in operative position over said cam during said drop off entering of the removing means and yieldable means urging said cantilever member to said operative position.

* * * * *